US009806353B2

(12) United States Patent
Chin et al.

(10) Patent No.: US 9,806,353 B2
(45) Date of Patent: Oct. 31, 2017

(54) FUEL CELL SEPARATOR WITH GASKET AND METHOD FOR MANUFACTURING THE SAME

(71) Applicant: Hyundai Motor Company, Seoul (KR)

(72) Inventors: Sang Mun Chin, Seoul (KR); Sae Hoon Kim, Gyeonggi-do (KR); Yoo Chang Yang, Gyeonggi-do (KR); Suk Min Baeck, Gyeonggi-do (KR); Seong Il Heo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 36 days.

(21) Appl. No.: 14/445,482

(22) Filed: Jul. 29, 2014

(65) Prior Publication Data

US 2014/0335444 A1    Nov. 13, 2014

Related U.S. Application Data

(62) Division of application No. 13/280,730, filed on Oct. 25, 2011, now Pat. No. 8,822,099.

(30) Foreign Application Priority Data

Nov. 17, 2010    (KR) .......................... 10-2010-0114717

(51) Int. Cl.
*H01M 8/0247*    (2016.01)
*H01M 8/0245*    (2016.01)
(Continued)

(52) U.S. Cl.
CPC ....... *H01M 8/0286* (2013.01); *H01M 8/0247* (2013.01); *H01M 8/0273* (2013.01);
(Continued)

(58) Field of Classification Search
None
See application file for complete search history.

(56) References Cited

U.S. PATENT DOCUMENTS 6,720,103 B1    4/2004  Nagai
7,419,738 B2    9/2008  Maus et al.
(Continued)

FOREIGN PATENT DOCUMENTS

CN        1459134 A       11/2003
JP     2004193108 A        7/2004
(Continued)

*Primary Examiner* — Patrick Ryan
*Assistant Examiner* — Zhongqing Wei
(74) *Attorney, Agent, or Firm* — Mintz Levin Cohn Ferris Glovsky and Popeo, P.C.; Peter F. Corless (57) ABSTRACT

The present invention provides a fuel cell separator with a gasket manufactured by integrally forming a gasket on one side of a separator; independently injection molding a frame gasket on a frame such that a first airtight portion covers the entire surface of the frame to maintain the shape of the frame gasket and a second airtight portion projects upward and downward from both ends of the first airtight portion; and bringing the first airtight portion of the frame gasket into contact with the other side of the separator with the gasket formed on one side thereof. To create a fuel cell stack in certain embodiments, the invention stacks the second airtight portion of the frame gasket on another second airtight portion of an adjacent unit cell with a membrane-electrode assembly interposed therebetween.

4 Claims, 8 Drawing Sheets

(51) Int. Cl.

| | |
|---|---|
| *H01M 2/08* | (2006.01) |
| *H01M 8/0228* | (2016.01) |
| *H01M 8/0286* | (2016.01) |
| *H01M 8/2404* | (2016.01) |
| *H01M 8/0273* | (2016.01) |
| *H01M 8/0276* | (2016.01) |
| *H01M 8/242* | (2016.01) |

(52) U.S. Cl.
CPC ......... *H01M 8/0276* (2013.01); *H01M 8/242* (2013.01); *H01M 8/2404* (2016.02); *Y02P 70/56* (2015.11)

(56) References Cited

U.S. PATENT DOCUMENTS

| | | |
|---|---|---|
| 2003/0031914 A1 | 2/2003 | Frank et al. |
| 2004/0137307 A1* | 7/2004 | Okonogi ............ H01M 8/0271 429/511 |
| 2004/0180255 A1 | 9/2004 | Maus et al. |
| 2009/0072496 A1* | 3/2009 | Kim .................... F16J 15/0818 277/637 |

FOREIGN PATENT DOCUMENTS

| | | |
|---|---|---|
| JP | 2007193970 A | 8/2007 |
| JP | 2009272287 A | 11/2009 |
| KR | 10-2005-0077081 | 8/2005 |
| WO | 2010/100906 A1 | 9/2010 |

\* cited by examiner

FIG. 1

(PRIOR ART)

FIG. 2

(PRIOR ART)

FIG. 3

(PRIOR ART)

FUEL CELL SEPARATOR WITH GASKET AND METHOD FOR MANUFACTURING THE SAME

CROSS-REFERENCE TO RELATED APPLICATION

This application is a Divisional Application of U.S. patent application Ser. No. 13/280,730, filed Oct. 25, 2011, which claims under 35 U.S.C. §119(a) the benefit of Korean Patent Application No. 10-2010-0114717 filed Nov. 17, 2010, the entire contents of which are incorporated herein by reference.

BACKGROUND (a) Technical Field

The present invention relates to a fuel cell separator with a gasket and a method for manufacturing the same. More particularly, it relates to a fuel cell separator with a gasket which can further improve airtightness, electrical stability, and durability, and a method for manufacturing the same.

(b) Background Art

The configuration of a fuel cell stack may be described as follows with respect to a unit cell. A membrane-electrode assembly (MEA) is positioned in the center of each unit cell of the fuel cell stack. The MEA comprises a polymer electrolyte membrane, through which hydrogen ions (protons) are transported, and an electrode/catalyst layer such as an air electrode (cathode) and a fuel electrode (anode), in which an electrochemical reaction between hydrogen and oxygen takes place, disposed on each of both sides of the polymer electrolyte membrane.

Moreover, a gas diffusion layer (GDL) and a gasket are sequentially stacked on both sides of the MEA, where the cathode and the anode are located. A separator including flow fields for supplying fuel and discharging water produced by the reaction is located on the outside of the GDL. After a plurality of unit cells are stacked together, an end plate for supporting the above-described components is connected to the outermost ends of the fuel cell stack, thereby completing the manufacturing the fuel cell stack.

Therefore, at the anode of the fuel cell stack, hydrogen is dissociated into hydrogen ions (protons, H+) and electrons (e−) by an oxidation reaction of hydrogen. The hydrogen ions and electrons are transmitted to the cathode through the electrolyte membrane and the separator, respectively. At the cathode, water is produced by the electrochemical reaction in which the hydrogen ions and electrons transmitted from the anode and the oxygen in air participate and, at the same time, electrical energy is produced by the flow of electrons.

The separator (especially, a metal separator) of the fuel cell stack includes flow fields formed by stamping a thin metal plate having a thickness of about 0.1 mm to supply a reducing gas and an oxidizing gas to the fuel cell stack, supply coolant for cooling the fuel cell stack, and collect and transmit generated electricity. Therefore, the separator should have airtightness and liquid-tightness such that the reducing gas, the oxidizing gas, and the coolant are not mixed together.

Therefore, the gasket is applied to one side of the separator to maintain the airtightness of the coolant and reactant gases (hydrogen and air) and, at the same time, support the gasket disposed on the other side of the separator.

The gasket is integrally formed on both sides of a metal separator by injection molding in terms of productivity during manufacturing of the fuel cell stack. An example of this is described with reference to FIG. 1 and FIG. 2.

Figure 1:
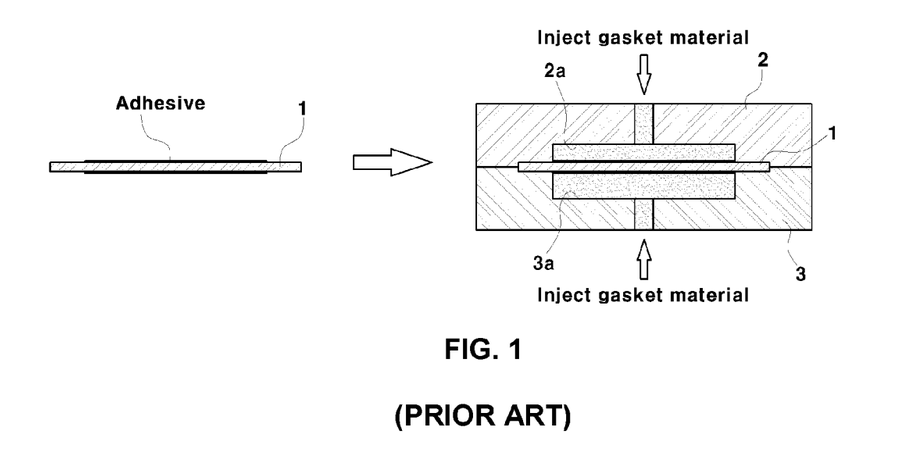
FIG. 1 is a cross-sectional view showing a generally conventional method of integrally bonding a gasket to a separator by injection molding.

In particular, FIG. 1 is a cross-sectional view showing a conventional method of integrally bonding a gasket 7 to a separator by injection molding. First, an adhesive is applied to an area, where the gasket 7 is to be formed, of the entire surface of a metal separator 1 (hereinafter referred to as a separator).

Then, the separator 1 is loaded on the top of a lower mold 3 in such a manner that the separator 1 is positioned between an upper gasket groove 2a and a lower gasket groove 3a, which are configured to fit the shape of the gasket 7 in an upper mold 2 and the lower mold 3.

Subsequently, the upper mold 2 is moved to press and fix the edge of the separator 1, and then a gasket material is injected into the top and bottom of the separator 1 to integrally mold and bond a gas side gasket 5 and a cooling side gasket 6 to both sides of the separator 1.

Figure 2:
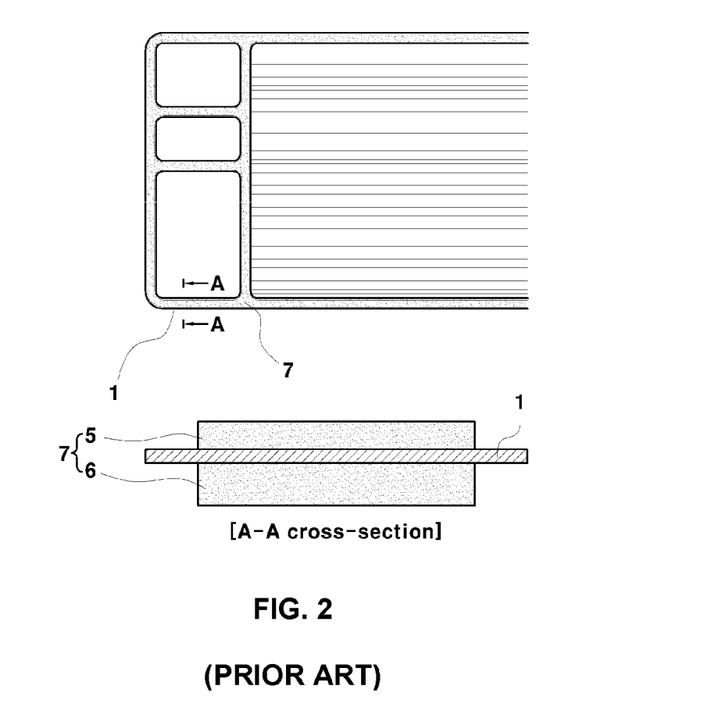
FIG. 2 is a plan view and a cross-sectional view showing the structure of a generally conventional metal separator integrated with a gasket by injection molding.

FIG. 2 is a plan view and a cross-sectional view showing the structure of the conventional metal separator 1 integrated with the gasket 7 by injection molding. As shown in the figure, the gasket 7 is integrally formed on the edge of the metal separator 1 and on the periphery of manifolds. The gasket 7 comprises the gas side gasket 5 integrally formed on the top of the metal separator 1 and maintaining the airtightness of reactant gas (hydrogen or air) and the cooling side gasket 6 integrally formed on the bottom of the metal separator 1 and maintaining the airtightness of coolant.

As such, the gasket 7 formed on the separator serves as a basis for defining each unit cell of the fuel cell stack and seals hydrogen, coolant, and air flow fields, respectively, formed on the surface of the separator 1.

While the above-described method of forming the gasket 7 on both sides of the separator 1 by injection molding can manufacture the fuel cell stack in a simple manner, the following problems are encountered during injection molding of the gasket 7, which will be described with reference to FIGS. 3 and 4.

Figure 3:
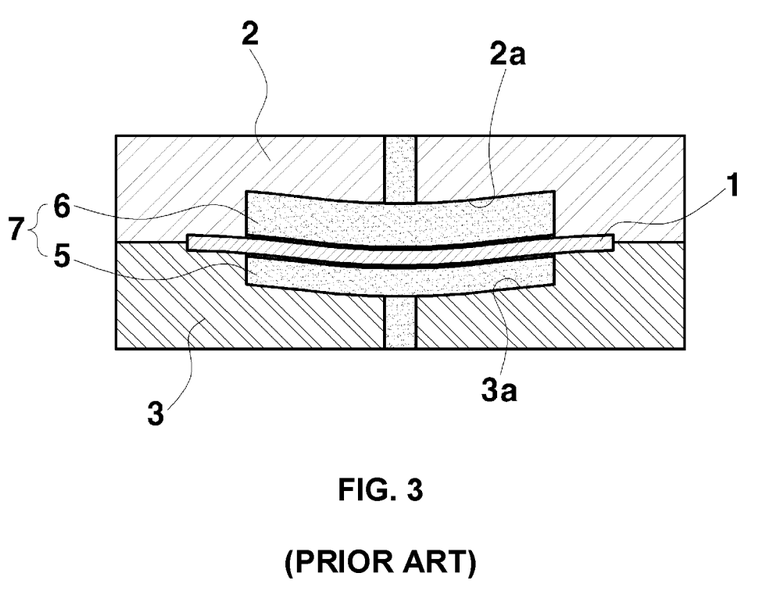
FIG. 3 is a cross-sectional view showing the occurrence of deformation and contamination of a separator during injection molding of a gasket.

FIG. 3 is a cross-sectional view showing the occurrence of deformation and contamination of the separator 1 during injection molding of the gasket 7.

The structures and thicknesses of the gas side gasket 5 and the cooling side gasket 6 formed on both sides of the separator 1 are different from each other, and thus when the gasket material is injected on both sides of the separator 1 formed of a thin plate having a thickness of about 0.1 mm, the midsection of the separator 1 may be bent downward due to a pressure difference between the gasket materials being flowed through both sides of the separator 1.

For example, when the gasket material is simultaneously injected into the upper gasket groove 2a formed in the upper mold 2 and the lower gasket groove 3a formed in the lower mold 3, the amount of the gasket material filled in the upper gasket groove 2a having a large thickness is greater than that of the gasket material filled in the lower gasket groove 3a having a small thickness, and thus a pressure difference between the gasket materials filled in the upper gasket groove 2a and the lower gasket groove 3a occurs. As a result, the midsection of the separator 1 is bent downward due to the pressure difference.

Moreover, a non-filled portion may occur due to a difference in flow rate between the gasket materials being flowed through both sides of the separator 1. Otherwise, the gasket material leaks from the upper and lower molds 2 and 3, which results in the formation of burrs.

For example, when the gasket material is injected into the gasket grooves 2a and 3a at the same pressure, the flow rate of the gasket material being flowed through the upper gasket grooves 2a is lower than that of the gasket material being flowed through the lower gasket groove 3a, which results in the occurrence of the non-filled portion.

Moreover, when the pressure of the gasket material being flowed through the upper gasket groove 2a is higher than the pressure applied to the edge of the separator 1, into which no gasket material is injected, the gasket material leaks from a gap between the upper and lower molds 2 and 3 and is then solidified, which results in the formation of the burrs.

In addition, when the gasket material is introduced through the gap between the upper and lower molds 2 and 3, it contaminates the surface of the separator 1, which increases the contact resistance of the separator 1, thereby deteriorating the performance of the fuel cell stack.

When the burrs are present in the flow fields of the separator having a concave-convex structure, the removal of the burrs cannot be automated using a tool or die cutter, and thus the removal of the burrs should be performed manually.

Figure 4:
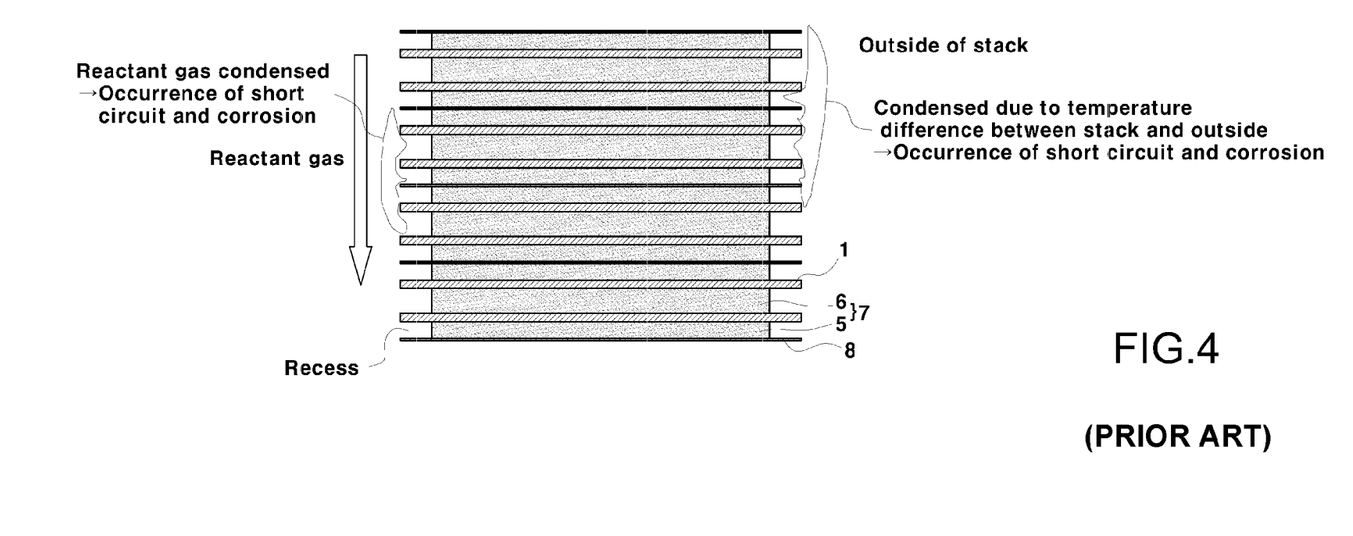
FIG. 4 is a cross-sectional view showing the occurrence of short circuit and corrosion in a recess of a conventional separator integrated with a gasket.

FIG. 4 is a cross-sectional view showing the occurrence of short circuit and corrosion in a recess of a conventional separator integrated with a gasket.

It can be seen from FIG. 4 that the gasket 7 is not formed on the edge of the separator 1, and the metal surface of this edge of the separator 1 on which the gasket 7 is not formed is always exposed to the outside.

The reason that the gasket 7 is not formed on the edge of the separator 1 is that when the gasket 7 is integrally formed on the separator 1, the edge of the separator 1 is in contact with the upper and lower molds 2 and 3 and held thereby.

Of course, even though the gasket 7 is not formed on the edge of the separator 1, it has no significant effect on the airtightness performance.

However, the edge of the separator 1 is a dead zone which is not related to the performance of the fuel cell. When the area of the edge of the separator 1 is increased to reduce the deformation of the separator 1, which is caused by the pressure difference between the gasket materials being flowed through both sides of the separator 1, the power density of the fuel cell stack may be reduced.

In particular, a recess formed in an empty space between the edges of the separators 1 is most likely to be exposed to high temperature and high humidity conditions, which often occur during operation of the fuel cell stack, and in this case, condensed water is formed in the recess formed in the empty space between the edges of the separators 1.

As a result, the condensed water flows through the unit cells to form an electrical path, which results in the occurrence of short circuit between the unit cells. Moreover, the surface of the separator 1 is corroded by the condensed water, which reduces the durability of the separator 1.

Reference numeral 8 in FIG. 4 denotes a membrane-electrode assembly (MEA).

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a fuel cell separator with a gasket and a method for manufacturing the same, which can solve problems such as deformation, contamination, etc., of the separator, which are caused by a difference in injection pressure applied to both sides of the separator when a gasket material is simultaneously injected on both sides of the separator, by injection molding the gasket material only on one side of the separator.

Moreover, the present invention provides a fuel cell separator with a gasket and a method for manufacturing the same, which can improve airtightness of the separator by providing a projection at both ends of a gasket frame including a frame mounted therein to cover and seal a recess formed between the edges of the separators and can solve problems such as insulation and corrosion of a fuel cell stack by employing a separator to which a gasket frame is applied during manufacturing of the fuel cell stack.

In one aspect, the present invention provides a fuel cell separator with a gasket, the fuel cell separator comprising: a gasket integrally formed on one side of a separator and maintaining airtightness; and a frame gasket configured independently from the separator, including a first airtight portion being in contact with the other side of the separator, and maintaining the airtightness.

In one embodiment, the first airtight portion of the frame gasket comprises a frame mounted therein to maintain the shape of the frame gasket.

In another embodiment, the frame gasket comprises a second airtight portion projecting upward and downward from both ends of the first airtight portion to seal the separator and the gasket and further secure the airtightness.

In still another embodiment, the first airtight portion is in contact with the edge of the separator on a cooling side and the periphery of manifolds to maintain the airtightness.

In another aspect, the present invention provides a method of manufacturing a fuel cell separator with a gasket, the method comprising: integrally forming a gasket on one side of a separator; injection molding a frame gasket on a frame such that a first airtight portion covers the entire surface of the frame to maintain the shape of the frame gasket and a second airtight portion projects upward and downward from both ends of the first airtight portion, the injection molding being performed independently from the formation of the gasket; and bringing the first airtight portion of the frame gasket into contact with the other side of the separator with the gasket formed on one side thereof and stacking the second airtight portion of the frame gasket on another second airtight portion of an adjacent unit cell with a membrane-electrode assembly interposed therebetween.

In one embodiment, the gasket is integrally formed on one side of the separator by injection molding a gasket material.

In another embodiment, the gasket is integrally formed on one side of the separator by applying a liquid gasket.

In still another embodiment, the gasket is integrally formed on one side of the separator by bonding a solid gasket using an adhesive.

In yet another embodiment, the first airtight portion covers the entire surface of the frame by an upper projection and a lower projection, which are integrally formed in an upper mold and a lower mold, respectively.

Other aspects and preferred embodiments of the invention are discussed hereinafter.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

10: separator;
11: first mold;
12: upper mold;
12a: upper gasket molding groove;
13: lower mold;
13a: separator receiving groove;
14: gas side gasket;
20: frame gasket;
21: frame;
22: first airtight portion;
23: second airtight portion;
24: second mold;
25: upper mold;
25a: upper receiving groove;
25b: upper intermediate groove;
25c: upper projection;
26: lower mold;
26a: lower receiving groove;
26b: lower intermediate groove; and
26c: lower projection.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Also, it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 5:
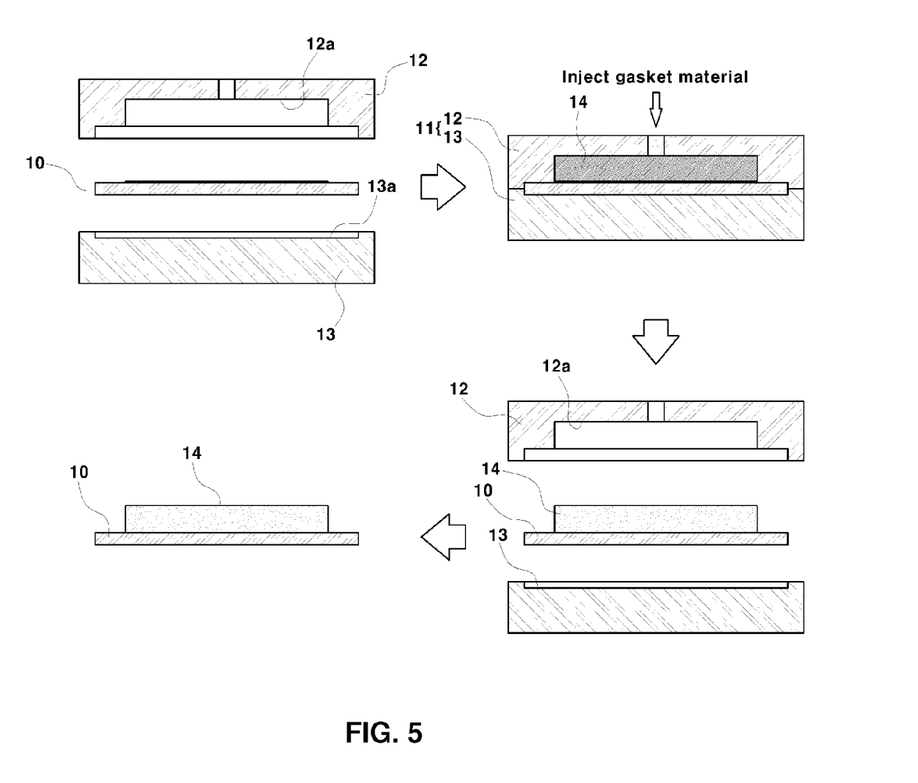
FIG. 5 is a schematic diagram showing a method for manufacturing a separator with a gasket injection-molded on one side of the separator in accordance with an illustrative embodiment of the present invention.

FIG. 5 is a schematic diagram showing a method for manufacturing a separator with a gasket injection-molded on one side of the separator in accordance with an illustrative embodiment of the present invention.

The present invention provides a fuel cell separator 10 with a gasket injection-molded on one surface thereof and a method for manufacturing the same.

The fuel cell separator 10 with the gasket for maintaining the airtightness is a metal separator, for example.

The method of manufacturing the fuel cell separator 10 with the gasket injection-molded on one surface thereof will be described below.

First, an adhesive is applied to the top of the separator 10, on which the gasket is to be injection-molded, e.g., by screening printing. Here, the adhesive applied to the surface of the separator 10 may be the same material as a gasket material, and preferably may be fluorine rubber or silicon rubber primer.

The separator 10 to which the adhesive is applied is loaded in a mold 11 (hereinafter referred to as a first mold) for injection molding the separator 10. The first mold 11 comprises an upper mold 12 and a lower mold 13. As an example, the upper mold 12 may be used as a movable mold and the lower mold 13 may be used as a fixed mold. An upper gasket molding groove 12a for forming a gas side gasket 14 is provided in the upper mold 12. Moreover, a separator receiving groove 13a is provided in the lower mold 13, and the bottom of the separator receiving groove 13a is a flat surface for supporting the bottom of the separator 10. The separator 10 to which the adhesive is applied is inserted into the separator receiving groove 13a of the lower mold 13. Then, the upper mold 12 is moved to close the lower mold 13. Here, the edge of the separator 10 is sandwiched between the upper mold 12 and the lower mold 13 by the pressing force of the upper mold 12. Finally, the gasket material is injected into the upper gasket molding groove 12a formed in the upper mold 12 to form the gas side gasket 14, and then the upper mold 12 is opened to remove the injection-molded gas side gasket 14 from the first mold 11, thus completing the manufacturing of the separator 10 with the gasket injection-molded on one surface thereof.

The gas side gasket 14 is injection-molded and integrally bonded to the top of the separator 10 manufactured by the above-described method. Here, the gas side gasket 14 is integrally bonded to the edge of a fuel electrode separator 10a or an air electrode separator 10b and to the periphery of manifolds to maintain the airtightness of the separator 10 such that hydrogen and oxygen introduced through the manifolds are supplied through flow fields of the separator 10.

Figure 6:
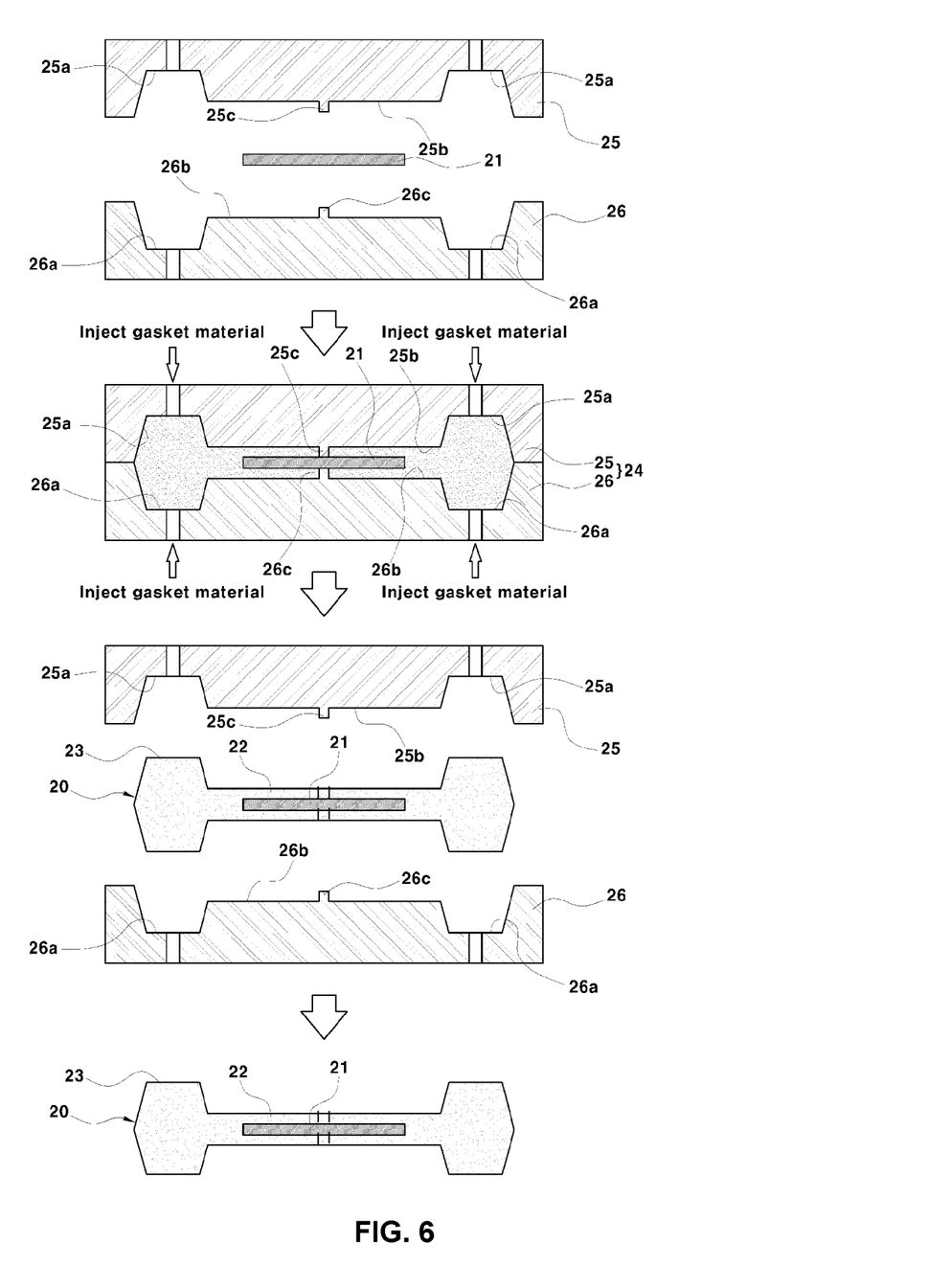
FIG. 6 is a schematic diagram showing a method for manufacturing a frame gasket in accordance with an illustrative embodiment of the present invention.

Moreover, a frame gasket 20 including a projection formed at both ends is injection-molded, separately from the manufacturing of the separator 10 with the gas side gasket 14 injection-molded on one surface thereof.

While the gas side gasket 14 is formed by injection molding, a liquid gasket may be applied to one side of the separator 10 or a solid gasket may be bonded to one side of the separator 10 using an adhesive, thereby integrally forming the gas side gasket 14 on one side of the separator 10.

Next, a method for manufacturing the frame gasket 20 in accordance with a preferred embodiment of the present invention will be described with reference to the accompanying drawings.

Figure 7:
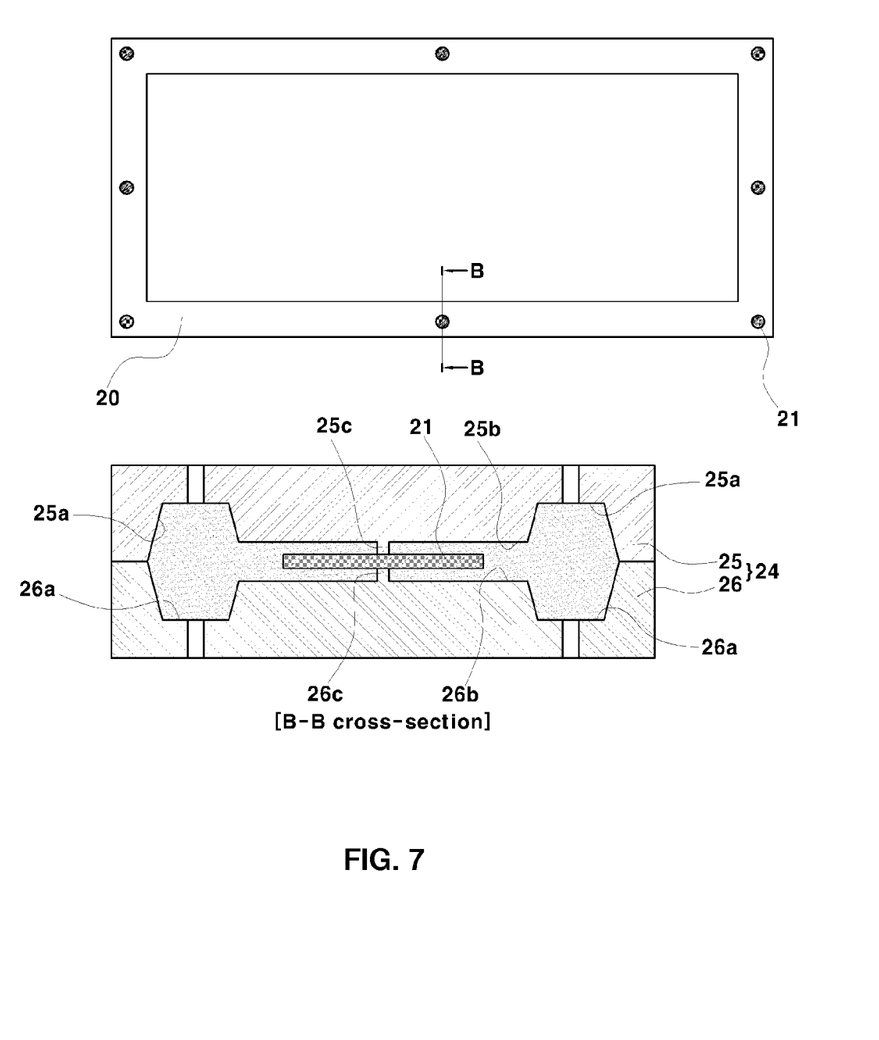
FIG. 7 is a plan view and a cross-sectional view showing a separator assembly in accordance with an illustrative embodiment of the present invention.

FIG. 6 is a schematic diagram showing a method for manufacturing a frame gasket in accordance with an illustrative embodiment of the present invention, and FIG. 7 is a plan view and a cross-sectional view showing a separator assembly in accordance with an illustrative embodiment of the present invention.

First, a frame 21, which will be inserted into the frame gasket 20 to maintain the shape of the frame gasket 20, is formed. The frame 21 has the same shape as the gas side gasket 14 and is formed of the same material as the separator 10. The frame 21 may be formed of a polymer such as plastic or a glass fiber material in terms of weight and cost. However, the frame 21 should be formed of a material that has a certain degree of stiffness to maintain the shape of the gasket during the automatic process of manufacturing the fuel cell stack.

A mold 24 (hereinafter referred to as a second mold) for injection molding the frame gasket 20 comprises an upper mold 25 including a pair of upper receiving grooves 25a formed at both sides thereof and a lower mold 26 including a pair of lower receiving grooves 26a formed at both sides thereof. The upper mold 25 may be used as a movable mold and the lower mold 26 may be used as a fixed mold. The upper receiving grooves 25a are arranged horizontally at a predetermined interval in the upper mold 25, and an upper intermediate groove 25b is provided between the upper receiving grooves 25a at a level lower than the tops of the upper receiving grooves 25a. Here, both sides of each upper receiving groove 25a are tapered in such a manner that the cross-sectional area of each upper receiving groove 25a increases downward such that the molded product can be easily removed from the mold.

Moreover, an upper projection 25c is formed to project downward from the center of the bottom of the upper mold 25 to guide the frame 21 to be located in the center of the frame gasket 20. In other words, the upper projection 25c is fixed to the bottom of the upper mold 25 to support the top center of the frame 21 such that the frame 21 is inserted between the upper intermediate groove 25b and a lower intermediate groove 26b, which will be described later, and is not moved during injection of the gasket material.

The lower receiving grooves 26a are arranged to correspond to the upper receiving grooves 25a in the lower mold 26, and the lower intermediate groove 26b is provided between the lower receiving grooves 26a at a level higher than the bottoms of the lower receiving grooves 26a. Here, both sides of each lower receiving groove 26a are tapered in such a manner that the cross-sectional area of each lower receiving groove 26a increases upward such that the molded product can be easily removed from the mold.

Moreover, a lower projection 26c is formed to project upward from the center of the top of the lower mold 26 to guide the frame 21 to be located in the center of the frame gasket 20. In other words, the lower projection 26c is fixed to the top of the lower mold 26 to support the bottom center of the frame 21 such that the frame 21 is inserted between the upper intermediate groove 25b and the lower intermediate groove 26b and is not moved during injection of the gasket material.

Each of the upper projection 25c and the lower projection 26c has a length such that the top and bottom of the frame 21 can be simultaneously fixed by the upper projection 25c and the lower projection 26c when the upper mold 25 and the lower mold 26 are closed. Moreover, the distance between the upper projection 25c and the lower projection 26c should be the same as or smaller than the thickness of the frame 21 to firmly fix the frame 21.

Then, the frame 21 is loaded in the second mold 24 having the above-described structure. During loading of the frame 21, the frame 21 is placed on the lower projection 26c provided between the lower receiving grooves 26a of the lower mold 26. Subsequently, the upper mold 25 is moved downward to be placed on the lower mold 26. Here, the upper projection 25c of the upper mold 25 presses the top of the frame 21 placed on the lower projection 26c of the lower mold 26 by the closing force of the upper mold 25 to fix the frame 21.

After the frame 21 is fixed, the gasket material is injected through inlets of the upper mold 25 and the lower mold 26 to form the frame gasket 20, and then the upper mold 25 is opened to remove the injection-molded frame gasket 20 from the second mold 24, thus completing the manufacturing of the frame gasket 20 with the projection formed at both ends thereof.

The frame gasket 20 formed by the above-described method comprises the frame 21 serving as a frame, a first airtight portion 22 covering the frame 21 and being in contact with the cooling side of the separator 10, and a second airtight portion 23 projecting from both ends of the first airtight portion 22 in the thickness direction of the gasket.

The first airtight portion 22 of the frame gasket 20 is located between the fuel electrode separator 10a and the air electrode separator 10b (i.e., on opposing sides of the first airtight portion), is in contact with the cooling side of the separator 10 by the fastening force of the fuel cell stack to maintain the airtightness, and supports the gas side gasket 14.

The second airtight portion 23 projects from both ends of the first airtight portion 22 in the stacking direction of the fuel cell stack (i.e., in the up and down direction) to cover the separator 10 and the gas side gasket 14 and seal the recess formed between the edges of the separators 10, thus further maintaining the airtightness of the fuel cell stack.

Figure 8:
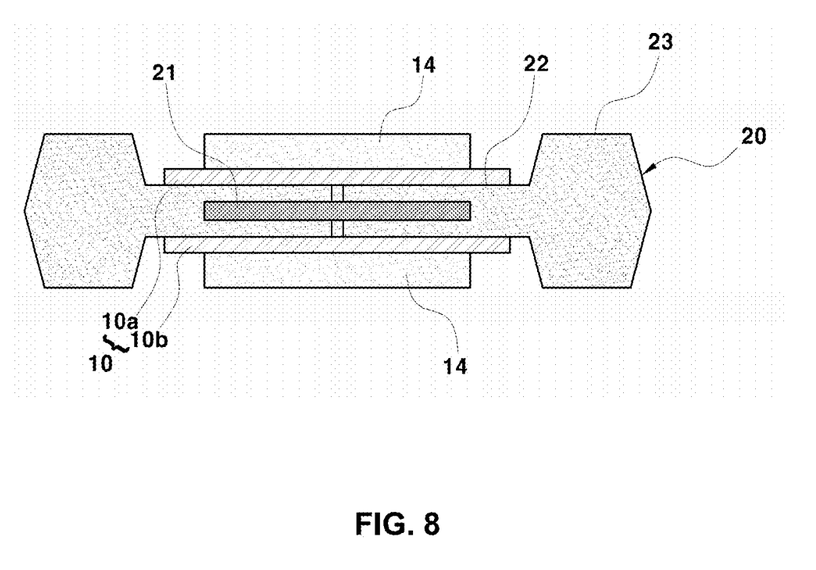
FIG. 8 is a cross-sectional view showing the structure of a separator assembly in a unit cell in accordance with an illustrative embodiment of the present invention.
Figure 9:
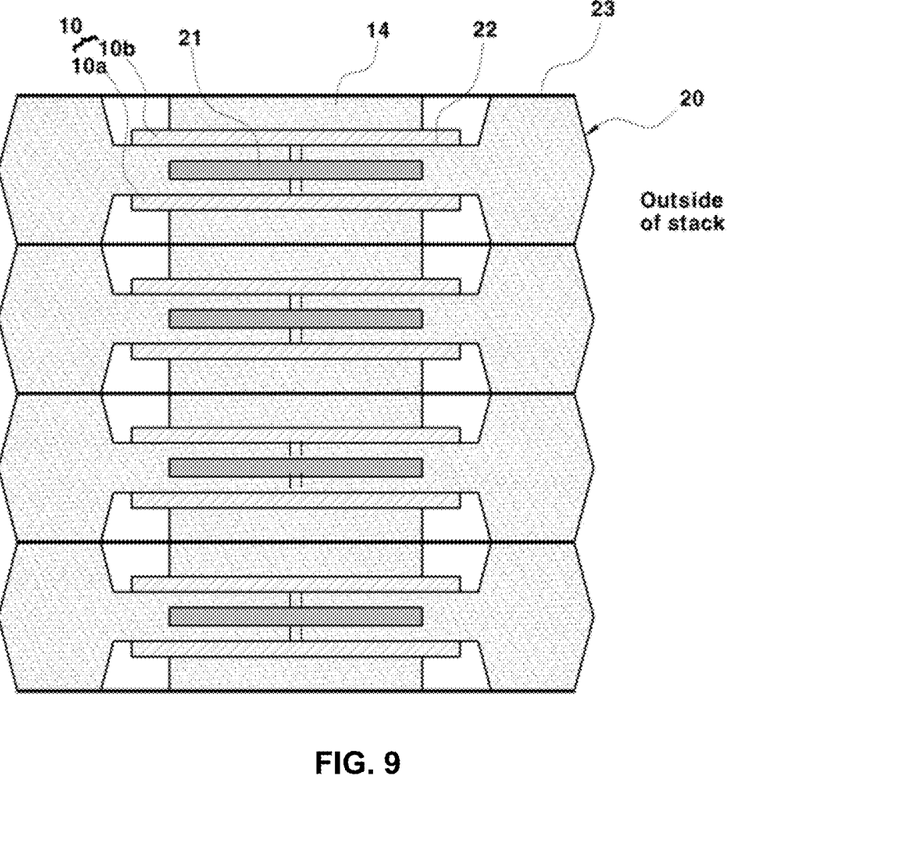
FIG. 9 is a cross-sectional view showing the structure of a fuel cell stack in accordance with an illustrative embodiment of the present invention.

FIG. 8 is a cross-sectional view showing the structure of a separator assembly in a unit cell in accordance with an illustrative embodiment of the present invention, and FIG. 9 is a cross-sectional view showing the structure of a fuel cell stack in accordance with an illustrative embodiment of the present invention. In one embodiment, the fuel cell stack is a vehicle fuel cell stack for use in powering vehicles (e.g., hybrid vehicles). Other uses of fuel cell stacks, however, may also benefit from the particular embodiments described herein.

As shown in the figures, the fuel cell stack comprises a plurality of unit cells, in which the air electrode separator 10*b* including an air electrode gasket injection-molded on the bottom thereof, the first airtight portion 22 of the frame gasket 20, the fuel electrode separator 10*a* including a fuel electrode gasket injection-molded on the top thereof, and a membrane-electrode assembly (MEA) 8 are sequentially stacked, the plurality of unit cells being repeatedly stacked.

The second airtight portion 23 of the gasket frame 20 is in contact with another second airtight portion 23 of an adjacent unit cell and is compressed by the fastening force of the fuel cell stack. Here, the thickness $t_2$ of the second airtight portion 23 projection from the top of the first airtight portion 22 is the sum of the thickness $t_1$ of the gas side gasket 14 and the thickness t of the separator 10 ($t_2 = t_1 + t$).

The operation and effect of the fuel cell separator with the gasket having the above-described configuration will be described below.

According to the present invention, the gasket material is injected only on one side of the separator 10, differently from the conventional separator with the gasket integrally formed on both sides thereof. When the gasket material is injected only on one side of the separator 10 according to the present invention, the other side of the separator 10 is supported by the flat surface of the mold, and thus it is possible to solve the problem of deformation of the separator 10, which is caused when the gasket material is simultaneously injected on both sides of the separator.

Moreover, when the gasket material is injected only on one side of the separator 10, it is possible to solve the problem that the gasket material is introduced through a gap between the upper and lower molds, which is caused by a pressure difference between both sides of the conventional separator in which the gasket material is simultaneously injected on both sides of the separator, and thus it is possible to prevent the contamination of the separator.

When the gasket material is injected on the frame 21, burrs may be formed on both sides of the second airtight portion 23. However, the burrs are different from those formed when the gasket material is injected on both sides of the separator, and the gasket material is not formed at the flow fields of the separator 10 having a concave-convex structure. The thus formed burrs project from both sides of the second airtight portion 23, and thus the removal of the burrs can be automated using a burr removal tool or die cutter.

The second airtight portion 23 of the frame gasket 20 projects upward and downward from both ends of the first airtight portion 22 and is stacked alternately with the MEA 8 to cover and seal the recess formed between the edges of the separators 10, thus insulating the unit cells from each other. As a result, the electrical stability and airtightness can be improved.

For example, the second airtight portion 23 seals the recess (i.e., empty space) formed between the edges of the separators 10 such that the condensed water formed in the recess is prevented from being moved to the other unit cells, and thus it is possible to prevent the occurrence of short circuit and corrosion, which are caused when the condensed water formed in the recess is exposed to the outside, and improve the durability of the separator 10.

The both sides of the second airtight portion 23 are tapered in such a manner that the cross-sectional area thereof decreases upward and downward with respect to the horizontal centerline of the frame 21, and thus it is possible to reduce the flow resistance of reactant gases introduced through the manifolds.

While the frame gasket 20 is uses as the cooling side gasket in the above embodiment of the present invention, it can be used as the gas side gasket 14.

Typically, the gasket is formed of expensive fluorine materials having excellent chemical resistance to resist the acidic environments of the reaction surface due to the nature of the fuel cell. However, when the cooling side gasket which is not required to have excellent chemical resistance is used instead of the frame gasket 20, it is possible to use less expensive materials such as silicon or EDPM.

As described above, the fuel cell separator with the gasket and the method for manufacturing the same according to the present invention have the following advantages.

1. As the gasket material is injected only one side of the separator, the other side of the separator is supported by the flat surface of the mold, and thus it is possible to alleviate the problem of deformation of the separator, which is caused when the gasket material is simultaneously injected on both sides of the separator.

2. As the gasket material is injected only on one side of the separator, it is possible to alleviate the problem that the gasket material is introduced through a gap between the upper and lower molds, which is caused by a pressure difference between both sides of the conventional separator in which the gasket material is simultaneously injected on both sides of the separator, and thus it is possible to prevent the contamination of the separator.

3. When the gasket material is injected on the frame, burrs may be formed on both sides of the second airtight portion. However, the burrs are different from those formed when the gasket material is injected on both sides of the separator, and the gasket material is not formed at the flow fields of the separator having a concave-convex structure. The thus formed burrs project from both sides of the second airtight portion, and thus the removal of the burrs can be automated using a burr removal tool or die cutter.

4. The second airtight portion of the frame gasket projects upward and downward from both ends of the first airtight portion and is stacked alternately with the MEA to cover and seal the recess formed between the edges of the separators, thus insulating the unit cells from each other. As a result, the electrical stability and airtightness can be improved.

5. The second airtight portion seals the recess (i.e., empty space) formed between the edges of the separators such that the condensed water formed in the recess is prevented from being moved to the other unit cells, and thus it is possible to prevent the occurrence of short circuit and corrosion, which are caused when the condensed water formed in the recess is exposed to the outside, and improve the durability of the separator.

6. The both sides of the second airtight portion are illustratively tapered in such a manner that the cross-sectional area thereof decreases upward and downward with respect to the horizontal centerline of the frame, and thus it is possible to reduce the flow resistance of reactant gases introduced through the manifolds.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a fuel cell separator with a gasket, the method comprising:

integrally forming a gasket on a first side of a fuel cell separator;

injection molding a frame gasket on a frame such that a first airtight portion of the frame gasket substantially covers an entire surface of the frame to maintain the shape of the frame gasket and a second airtight portion of the frame gasket projects upward and downward from both ends of the first airtight portion, the frame gasket being formed independently of the gasket, and the injection molding being performed independently from the formation of the gasket; and bringing the first airtight portion of the frame gasket into contact with a second side of the fuel cell separator.

2. The method of claim 1, wherein the frame gasket is part of a unit cell, the method further comprising: stacking the second airtight portion of the frame gasket on another second airtight portion of an adjacent unit cell with a membrane-electrode assembly interposed therebetween.

3. The method of claim 1, wherein the step of integrally forming the gasket on the first side of the fuel cell separator is carried out by injection molding a gasket material.

4. The method of claim 1, wherein the first airtight portion covers the entire surface of the frame except for where an upper projection and a lower projection are integrally formed in an upper mold and a lower mold for the injection molding, respectively.

* * * * *